United States Patent [19]

Blenner et al.

[11] Patent Number: 4,738,999

[45] Date of Patent: Apr. 19, 1988

[54] FIBER REINFORCED COMPOSITES

[75] Inventors: Donald R. Blenner, Erie; Karen M. Bond, Edinboro; Alan J. Hannibal, Erie, all of Pa.

[73] Assignee: Lord Corporation, Erie, Pa.

[21] Appl. No.: 846,443

[22] Filed: Mar. 31, 1986

[51] Int. Cl.$^4$ .......................... C08K 7/14; C08K 7/12; C08K 7/10; C08K 7/02

[52] U.S. Cl. ...................................... 524/80; 524/404; 524/428; 524/443; 524/590; 524/871; 524/872; 524/873; 524/875; 525/424

[58] Field of Search ............... 524/871, 873, 872, 875, 524/80, 404, 428, 443, 590; 528/65, 66; 525/424

[56] References Cited

U.S. PATENT DOCUMENTS

| | | | |
|---|---|---|---|
| 3,730,936 | 5/1973 | Bugmann | 524/871 |
| 3,808,078 | 4/1974 | Snellman et al. | 156/175 |
| 3,892,713 | 7/1975 | Burkus et al. | 528/65 |
| 4,023,835 | 5/1977 | Ewing et al. | 285/305 |
| 4,485,719 | 12/1984 | Mendelsohn et al. | 528/66 |

*Primary Examiner*—Lewis T. Jacobs
*Attorney, Agent, or Firm*—John A. Gazewood

[57] ABSTRACT

Compositions comprising elastomeric polyurethane prepolymers comprising the reaction product of at least one diisocyanate selected from the group consisting of p-phenylene diisocyanate, m-phenylene diisocyanate, 1,4-cyclohexyl diisocyanate, tetramethylxylyl diisocyanate and dimethylphenyl diisocyanate and at least one polyol or polythiol characterized by the presence of two hydroxyl or thiol groups or one hydroxy and one thiol group; a monomeric diol or dithiol curing agent and vein forcing fiber are especially useful for preparing fiber-reinforced composite structures, especially for dynamic applications.

27 Claims, No Drawings

FIBER REINFORCED COMPOSITES

This invention relates to fiber reinforced composite structures. More particularly, the invention relates to such structures comprising cured polyurethane elastomer matrix having incorporated therein fibrous reinforcing material.

Fiber reinforced composite structures comprising a binder phase and a fiber reinforcing phase are well known articles of commerce which have been employed in various engineering applications because of their very high strength-to-weight ratio, that is, tensile strength divided by specific gravity. Because of the anisotropic character of these substances, the strengths of both the reinforcing fiber and the binder material are of significance, with the fiber contributing the major portion. The binder materials, which can be thermosetting or thermoplastic, are selected on the basis of their adhesiveness, fatigue resistance, heat resistance, chemical resistance, moisture resistance, and the like.

The thermosetting binder resins typically cure to hard glassy materials which are brittle in nature. While such rigid composites are being widely used, they have not been entirely satisfactory, for example, in impact resistance, in carrying torsional loads, or in accommodating misalignment between members. Attempts to improve the properties of the rigid composites have included either or both of design and compositional approaches. For example, Smith et al U.S. Pat. No. 4,325,174 discloses a drive shaft of tubular form comprising fiber reinforcement set in a rigid matrix comprising a thermoset resin, preferably an epoxy resin. The design of the shaft and its accoutrements is particularly effective to decrease its weight without loss of other properties. Cheney U.S. Pat. No. 4,332,525 discloses a bearingless rotor blade system which contains a flexbeam, with the flexbeam having a matched in-plane and out-of-plane stiffness. The matched stiffness of the flexbeam is produced by employing materials of different flexibilities. In a specifically described embodiment, the flexbeam comprises a composite structure which includes a plurality of layers of high modulus of elasticity fibers such as glass or carbon fibers in combination with a matrix comprising a mixture of flexible and rigid epoxy resins. U.K. patent specification No. 1,346,997 discloses composite structures in which rigid matrices, which contain fiber reinforcement, are sheathed in natural or synthetic rubbers, thereby affording the possibility of altering flexibility, brittleness and damping of the composite. Japan Kokai No. 53-73732 discloses the addition of rubbers and thermoplastic resins to thermosetting rigid resins to improve shock resistance and vibration attenuating properties.

Toughening of the thermosetting rigid matrixes, see Japan Kokai 53-73732, can be effective in improving impact resistance, shock resistance, crack resistance and vibration attenuating properties, but does not appreciably affect flexibility of the matrices. Flexibilizing, see Cheney U.S. Pat. No. 4,332,525, does provide an improvement in flexibility by reducing the modulus of the matrix; however, it is typically accompanied by a loss in other properties.

When fiber reinforced composite structures are subjected to static loads, the brittleness of the thermosetting and thermoplastic matrix materials (when cured or set, both types of matrix materials are below their glass transition temperature) is not a disadvantage. However, in situations when the composite structure is subjected to dynamic loads, such as rotational, misalignment and vibrational forces, the lack of flexibility which is derived from the extremely high modulus and low extensibility of the rigid matrix materials becomes paramount. An accommodation to the poor flexibility of rigid matrix materials can be made by designing longer members, for example, when using epoxy matrix composites to accommodate the loads and motions in flap, lead-lag and feathering of helicopter rotors for various static and flight conditions, a rather long flexure has been required (on the order of 2800 mm in diameter). While increasing member length can result in improved flexibility, other problems are introduced, for example, "booming", a condition or noise which results from out-of-round rotation of longer members such as driveshafts operating at higher speeds. Equally important, the design envelope into which the composite structure must fit cannot, in most cases, accommodate to the increased length.

It has been proposed to replace the rigid matrix materials, such as epoxy and polyester resins, in whole or in part by flexible matrices, such as elastomeric materials. For example, Sanders et al U.S. Pat. No. 4,455,123 discloses a fiber reinforced composite comprising a connecting element having end regions connected by an intermediate section with fiber reinforcement extending longitudinally end-to-end. The fibers in the end regions are embedded in a thermoset rigid matrix such as an epoxy resin with the fibers in the intermediate region being embedded in a resilient material, such as rubber or an elastomeric polyurethane. The construction of the composite is said to permit resilient torsional movement of the end regions about the longitudinal axis of the structure. Kobalter U.S. Pat. No. 3,860,134 discloses a composite comprising a flexible nozzle having a main conically shaped body portion comprised of helically wound alternating layers of, (1) natural, synthetic or silicone-based elastomers, such as natural, ethylene-propylene and polyisoprene rubbers, which do not contain fiber reinforcement; and, (2), natural, synthetic or silicone-based elastomers containing fiber reinforcement. Alternatively, one can employ as (2) a fiber reinforced rigid matrix which has been encapsulated or impregnated with a natural, synthetic or silicone-based elastomer. The composites are said to provide flexibility while at the same time having sufficient rigidity to withstand pressure and structural loadings. Ewing et al U.S. Pat. No. 4,023,835 discloses a flexible sleeve particularly adapted for use as a coupling for joining underground sewer or drainage pipe. The sleeve is a fiber reinforced composite comprising a combination of elastomeric binder and helically oriented fiber reinforcement. The elastomeric binder material can be any natural or synthetic elastomeric material, including natural, neoprene, styrene-butadiene and polybutadiene rubbers. An elastomeric polyesterurethane prepolymer cured with a polyfunctional polyol is a preferred elastomeric material. Snedman et al. U.S. Pat. No. 3,808,078 discloses a glass fiber cable comprising a plurality of individual glass fibers which are impregnated with a curable elastomeric material, such as a polyurethane prepolymer. According to the patentees, resistance to internal abrasion and fracture as the cable is flexed during use is improved.

The elastomeric matrix materials do offer significant improvements in flexibility over rigid matrices. The combination of lower modulus and higher elongation provides capabilities in matrix-dominated directions which are not attainable with rigid matrices and thus affords product opportunities, especially in dynamic applications, which are not possible with rigid matrix composites. Despite their promise, efforts to use these materials for fiber-reinforced composites have been limited by poor processability, difficulties in fabrication, poor structural integrity of the composite, severe internal heat generation and the substantial changes in matrix material properties caused by temperatures. There remains a clear need for binder resins for reinforced structural components, particularly those which perform energy storage or motion accommodation functions, such as springs, flexible couplings, driveshafts and helicopter rotor flexures.

In accordance with the present invention, there are provided novel fiber reinforced flexible composite structures characterized by low heat build-up under dynamic flexing conditions, a capacity to accommodate high misalignment between centers, excellent fatigue life, excellent hydrolytic, chemical and abrasion resistance and retention of properties over a broad temperature range, e.g., −40° to 100° C. Flexible composites prepared in accordance with the invention are particularly suitable for use in making composite driveshafts, torque tubes, power transmission couplings, armor, tank track pads, hose, wear pipe connectors, chutes conveyor belts, solid tires and pneumatic tires.

More particularly, in one aspect of this invention, there is provided a novel structural material comprising a curable matrix material and at least one fiber reinforcement embedded in said matrix material, characterized in that said curable matrix material comprises an elastomeric polyurethane composition consisting essentially of an admixture of (a) at least one isocyanate functional polyurethane prepolymer composition comprising the reaction product of at least one diisocyanate compound selected from the group consisting of p-phenylene diisocyanate, m-phenylene diisocyanate, 1,4-cyclohexyl diisocyanate, tetramethylxylyl diisocyanate and dimethyldiphenyl diisocyanate and at least one polyol or polythiol characterized by the presence of two hydroxyl or thiol groups, including such compounds which contain one hydroxy group and one thiol group; and (b) at least one monomeric diol or dithiol having from 2 to 20 carbon atoms. In another aspect of the invention there is provided a novel fiber reinforced flexible composite structure formed from the structural materials of the invention; and, in yet another aspect of the invention, there is provided a method for making fiber reinforced flexible composite structures utilizing the structural materials of the invention.

The elastomeric polyurethane prepolymers which are essential to the success of the invention comprise the reaction product of at least one diisocyanate selected from a first group consisting of m-phenylene diisocyanate, p-phenylene diisocyanate, 1,4-cyclohexyl diisocyanate, tetramethylxylyl diisocyanate, and dimethyldiphenyl diisocyanate and at least one compound having at least 2 carbon atoms but only 2 active hydrogen atoms, wherein the group containing the active hydrogen can be either of or both hydroxyl and thiol. The proportions of the diisocyanate and active hydrogen atom-containing compounds are controlled so that the resulting prepolymer has a free isocyanate content in the range from 2 to 12 percent by weight.

The diisocyanates listed above can be replaced with up to 60 percent of substantially any other known diisocyanate which is not included within the list, with the sterically hindered diisocyanates, particularly the aromatic diisocyanates such as toluene diisocyanate, being preferred. As a general rule, the amount of aliphatic diisocyanate will be less, e.g., on the order of not more than 40 percent, than with the more sterically hindered compounds. Such replacement is generally favorable economically, but may result in prepolymers which may not possess optimal properties, although remaining eminently suitable for the purposes of the invention. Some amount of experimentation of a routine nature may thus be necessary.

Active hydrogen atom-containing compounds which can be employed to form the required isocyanate-functional prepolymers of the invention include monomeric diols having from 2 to 20 carbon atoms, monomeric dithiols having from 2 to 20 carbon atoms, and polymeric diols and dithiols, including polyesters, polyethers, polyacetals polycarbonates and aliphatic dihydric polyols having at least one thio group and/or at least one dithio group, preferably at least one thio group, in the aliphatic chain, said polymeric diols and dithiols having 2 hydroxyl or thiol groups and a molecular weight in the range from 200 to 6000, preferably in the range from 300 to 3000. Particularly preferred active hydrogen atom containing compounds are the polyether diols, with polytetramethylene glycol ethers being currently the starting compounds of choice. These compounds and the manner of making them are so well known in the art that a detailed discussion or listing of representative materials is considered unnecessary.

The urethane prepolymers which are essential to the practice of this invention are prepared using conventional techniques which are well known in the art. The first group of isocyanate compounds are solid materials which need to be solubilized before being reacted with the active hydrogen atom-containing compounds. In one effective method, an appropriate amount of dried first isocyanate compound flakes is dissolved into a dried molten polyol which has been degassed under a nitrogen blanket. After the isocyanate compound has been dissolved, the reaction temperature is raised above the melting point of the isocyanate compound. When the desired isocyanate content endpoint is attained, the reactor is purged with nitrogen and the reaction mix is cooled to stop the reaction. The prepolymer can be used immediately or stored, preferably under nitrogen, for future use.

The curing agents which are employed in the practice of the invention can be any compound having from 2 to 20 carbon atoms and 2 active hydrogen atoms, wherein the group containing the active hydrogen atom can be either of or both hydroxyl or thiol. The curing agents preferably have a molecular weight below 360. Representative compounds include 1,4-butane diol, 1,2-ethane diol, 1-2 propane diol, 1,6-hexane diol, dipropylene glycol, hydroquinone di-($\beta$ hydroxy ethyl) ether and resorcinol di($\beta$-hydroxy ethyl) ether.

The fiber reinforcement may be in the form of short or long fibers or in the form a yarn composed of many filaments, non-woven and woven fabric, roving or tape. Typical fiber reinforcement include carbon fibers, boron fiber, aromatic amide fibers, asbestos fibers, glass fibers and fibers of silica, silica alumina, potassium nitrate, silicon carbide, boron nitride and boron, with carbon and glass fibers being especially preferred. The fiber reinforcement is present in an amount in the range from 20 to 90 percent by weight preferably, 30 to 85 percent by weight.

In preparing the curable elastomeric matrix compositions which are essential to the practice of the invention, the isocyanate-functional prepolymer and monomeric curing agent are mixed prior to use. Preferably, predried molten curing agent which has been degassed is added to molten prepolymer, with the curing agent being employed in an amount in the range from 0.9 to 1.15 of the stoichiometric amount, based on the free isocyanate content with the prepolymer. Preferably, the curing agent is employed at 95 percent of the stoichiometric amount.

The fiber reinforcing elements are treated with the liquid curable elastomeric matrix composition to at least coat the reinforcing element. Preferably, the fiber element is impregnated with the matrix composition. Sheets or plies of the elastomeric matrix composition-treated reinforcing element can be stacked to the desired thickness and configuration. Alternatively, and in some instances, preferably, roving, tape, filaments, etc. of the treated reinforcing elements can be laid up on a forming surface such as a mandrel.

Curing of the composite structures of the invention is effected at temperature in the range of 70° to 160° C., at pressures ranging from atmospheric to 10 MPa. At times, a post cure at temperatures in the same range for up to 24 hours at atmospheric pressure can be effective with respect to final properties of the cured fiber reinforced composite.

The following examples are provided to further illustrate the invention. Except where otherwise noted, the amounts of all components are in parts by weight.

EXAMPLE 1

A prepolymer was prepared by reacting a molar ratio of 1:2 of polytetramethylene glycol (650 MW) and p-phenylene diisocyanate. The glycol was degassed at 110°–120° for 1½ hours at less than 20 mm Hg. The solid p-phenylene diisocyanate was added to the degassed polyol and reaction was effected under a nitrogen blanket at a temperature of 90°–95° C. until the percent NCO dropped to within 0.5 percent of the theoretical level (7.5 percent).

210 grams of the thus-prepared prepolymer was mixed with a 95 percent stoichiometric amount of 1,4-butanediol and the mixture was cured in a closed tensile mold for two hours at 100° C. and 3.5 MPa. The tensile slab was then post-cured for 16 hours at 100° C. in an oven at atmospheric pressure. Dynamic mechanical properties of the cured slabs were determined on a Rheometrics dynamic spectrometer over a temperature range from −60° C. to 150° C. and a frequency range from 1 Hz to 10 Hz. Tensile modulus and strength were determined on a Universal Test Machine. The properties are reported in Table I. Shown for comparison purposes in Table I are the properties of urethane elastomers prepared from commercially available prepolymers, which were cured and tested in the same manner.

EXAMPLE 2

A prepolymer was prepared in similar manner as Example 1 in which the reactants were polytetramethylene glycol of molecular weight 1000 and paraphenylene diisocyanate. Test specimens were prepared, cured, and tested in similar manner as Example 1. Results are shown in Table I.

EXAMPLE 3

A prepolymer was prepared in similar manner as Example 1 in which the reactants were polytetramethylene glycol of molecular weight 1500 and paraphenylene diisocyanate. Test specimens were prepared, cured, and tested in similar manner as Example 1. Results are shown in Table I.

EXAMPLE 4

A prepolymer was prepared in same manner as Example 1, in which the reactants were polytetramethylene glycol of molecular weight 2000 and paraphenylene diisocyanate. Test specimens were prepared, cured, and tested in similar manner as Example 1. Results are shown in Table 1.

EXAMPLE 5

A prepolymer was prepared in similar manner as Example 1 in which the reactants were polycarbonate diol of molecular weight of 775 and paraphenylene diisocyanate. Test specimens were prepared, cured, and tested in similar manner as Example 1. Results are shown in Table 1.

EXAMPLE 6

A prepolymer was prepared in similar manner as Example 1 in which the reactants were a polycapralactone diol of molecular weight 550 and paraphenylene diisocyanate. Test specimens were prepared, cured, and tested in similar manner as Example 1. Results are shown in Table 1.

EXAMPLE 7

A prepolymer was prepared in similar manner as Example 1 in which the reactants were polytetramethylene glycol of molecular weight 650 and 1:1 blend of 1,4 transcyclohexyl diisocyanate and toluene diisocyanate. Test specimens were prepared, cured, and tested in similar manner as Example 1. Results are shown in Table 1.

EXAMPLE 8

A prepolymer was prepared in similar manner as Example 1 except that the reactants were polytetramethylene glycol (1000 MW) and dimethyldiphenyl isocyanate. Test specimens were prepared, cured and tested in similar manner as in Example 1. Results are shown in Table I.

EXAMPLE 9

The prepolymer prepared in Example 2 was mixed with a 95 percent stoichiometric amount of resorcinol di(β-hydroxylethyl) ether and was cured in a closed tensile mold at 100° C. and 3.5 MPa. The tensile slab was then post cured for 16 hours at 100° C. in an oven at atmospheric pressure. Dynamic mechanical properties of the cured slabs were determined on a Rheometrics dynamic spectrometer over a temperature range from −68° C. to 150° C. and a frequency range from 1 Hz to 10 Hz. Tensile modulus and strengths were determined on a Universal Test Machine. Results are shown in Table I.

EXAMPLE 10

Prepolymers were prepared following the procedure of Example 1 and identified as Control A, Control B and Control C prepolymers. Control A prepolymer is prepared from toluene diisocyanate and polytetramethylene glycol having a molecular weight of 1000; Control B prepolymer is prepared from toluene diisocyanate and polytetramethylene glycol having a molecular weight of 650; and Control C is prepared from methylene-bis (phenyl isocyanate) and polytetramethylene glycol having a molecular weight of 650.

Control A and B prepolymers were cured with a 95 percent stoichiometric amount of methylene bis(dichloro aniline) following the procedure of Example 1, as was Control C, except that Control C was cured with a 95 percent stoichiometric amount of a 3:1 mixture of 1,4-butane diol (3) and trimethylolpropane (1). Test specimens were prepared, cured and tested in accordance with the procedure of Example 1, with the results being reported in Table I.

EXAMPLE 11

Following the procedure of Example 1, a first matrix composition consisting essentially of the prepolymer of Example 2 and a 95 percent stoichiometric amount of 1,4-butane diol and a second matrix composition consisting essentially of Control C prepolymer and a 95 percent stoichiometric amount of a 3:1 mixture, respectively, of 1,4-butadiene diol and trimethylol-propane were prepared.

Fiberglass composite panels are prepared from each of the compositions by filament winding and the panels are cured in a closed mold at 100° C. and 3.5 MPa. The dynamic modulus and damping (Tangent $\delta$) of the composites were determined using the Rheometric dynamic spectrometer. The tangent $\delta$ of the composite made from the urethane of Example 2 is significantly lower than that of the composite made from the Control C urethane at a temperature of 20° C. and exhibits less sensitivity to temperature. The tangent $\delta$ is 25 times greater for the control panel at 20° C. and the loss modulus is 10 times greater for the control panel at this temperature.

EXAMPLE 12

Employing the first and second matrix compositions of Example 11 and a third matrix composition comprising bisphenol A poly glycidylether in admixture with polyamide curing agent, fiber reinforced drive tubes were constructed by filament winding E-glass fiber impregnated with the selected matrix composition. All shafts were wound at a lay angle of ±45°. The drive tubes prepared from the first and second matrix compositions were dimensioned as follows: 49 mm outside diameter, 31.5 mm inside diameter, 8.76 mm wall thickness and 1117.6 mm total length. Drive tubes prepared from the epoxy-containing third matrix composition were dimensioned as follows: 44.1 mm outside diameter, 31.5 inside diameter, 6.27 mm wall thickness and 1117.6 mm total length. Fiber volume was 62 percent in all cases. The drive tubes were subjected to cyclic oscillating torsion and bending deflection at a constant torque of 1145 N-m and a misalignment of 6°. The drive tube prepared from the epoxy-containing matrix composition failed after 5800 cycles at a speed of 60 rpm. The drive tube prepared from the second matrix composition failed after 10,000 cycles at a speed of 180 rpm. The drive tubes made from the first matrix composition showed no sign of failure after $5.5 \times 10^6$ cycles at a speed of 600 rpm and maintained a relatively constant temperature between 35° and 37° C.

TABLE I

|  | Shear Modulus $\sigma$ 20° C., dynes/CM$^2$ | Tangent $\delta$, RT | Temp. °C. $\sigma$ Tangent $\omega$, Max | Tensile Modulus $\sigma$ 3$\Delta$ strain $\sigma$ 20° C., MPa | Tensile Strength $\sigma$ 20° C., MPa |
|---|---|---|---|---|---|
| Control A | $1.8 \times 10^8$ | .08 | −30 | 43.6 | 34.9 |
| Control B | $4 \times 10^9$ | .08 | 80 | 436.7 | 61.1 |
| Control C | $4 \times 10^9$ | .25 | 40 | 87.3 | 43.7 |
| Example 1 | $9 \times 10^8$ | .024 | −22 | 236 | 39.3 |
| Example 2 | $7 \times 10^8$ | .017 | −45 | 117.5 | 40.0 |
| Example 3 | $4.5 \times 10^8$ | .017 | −50 | 79.9 | 44.5 |
| Example 4 | $3.5 \times 10^8$ | .035 | −55 | 54.5 | 31.0 |
| Example 5 | $1.1 \times 10^9$ | .08 | −10 | 151.7 | 43.5 |
| Example 6 | $1.5 \times 10^9$ | .11 | 0 | 285.6 | 35.2 |
| Example 7 | $8 \times 10^8$ | .05 | −40 | — | — |
| Example 8 | $6 \times 10^8$ | .03 | −35 | 73.3 | 31.0 |
| Example 9 | $7 \times 10^8$ | .02 | −40 | — | — |

We claim:

1. A structural material comprising from about 10 to about 80 percent by weight of a curable matrix and from about 90 to about 20 percent by weight at least one fiber reinforcing element embedded in said matrix; said matrix is an elastomeric polyurethane composition comprising the reaction product of
   (a) at least one isocyanate-functional polyurethane composition comprising the reaction product of at least one diisocyanate compound selected from the group consisting of p-phenylene diisocyanate, m-phenylene diisocyanate, 1,4-cyclohexyl diisocyanate, tetramethylxylyl diisocyanate and dimethyldiphenyl diisocyanate and an active hydrogen atom-containing compound characterized by the presence of two hydroxy groups or two thiol groups, said active hydrogen atom-containing compound containing no other isocyanate-reactive groups; and,
   (b) an amount effective to promote curing of said polyurethane of at least one monomeric compound having from 2 to 20 carbon atoms and two hydroxy or thiol groups, said monomeric compound having no other isocyanate-reactive groups.

2. A structural material according to claim 1 wherein said monomeric compound (b) is present in a stoichiometric amount with respect to the isocyanate content of said polyurethane (a).

3. A structural material according to claim 1 wherein said polyurethane (a) has a free isocyanate content in the range from 2 percent to 12 percent.

4. A structural material according to claim 3 wherein said diisocyanate comprises p-phenylene diisocyanate.

5. A structural material according to claim 4 wherein said monomeric compound (b) comprises 1,4-butane diol.

6. A structural material according to claim 4 wherein said monomeric compound (b) comprises hydroquinone di-($\beta$ hydroxy ethyl) ether.

7. A structural material according to claim 4 wherein said monomeric compound (b) comprises resorcinol di-($\beta$ hydroxy ethyl) ether.

8. A composite structure comprising from about 10 to about 80 percent by weight a cured flexible elastomeric matrix having from about 90 to about 20 percent by weight of reinforcing material distributed therein; said cured flexible elastomeric matrix comprises the reaction product of
   (a) at least one isocyanate-functional polyurethane composition comprising the reaction product of at least one diisocyanate compound selected from the group consisting of p-phenylene diisocyanate, m-phenylene diisocyanate, 1,4-cyclohexyl diisocyanate, tetramethylxylyl diisocyanate and dimethyl diphenyl diisocyanate and an active hydrogen atom-containing compound characterized by the presence of two hydroxy groups or two thiol groups, said active hydrogen atom-containing compound containing no other isocyanate-reactive groups; and
   (b) an amount effective to promote curing of said polyurethane composition of at least one monomeric compound having from 2 to 20 carbon atoms and two hydroxy or thiol groups, said monomeric compound having no other isocyanate-reactive groups.

9. A composite structure according to claim 8 wherein said monomeric compound is present in a stoichiometric amount with respect to the isocyanate content of said polyurethane (a).

10. A composite structure according to claim 8 wherein said polyurethane (a) has a free isocyanate content in the range from 2 to 12 percent.

11. A composite structure according to claim 10 wherein said diisocyanate comprises p-phenylene diisocyanate.

12. A composite structure according to claim 11 wherein said monomeric compound (b) comprises 1,4-butane diol.

13. A composite structure according to claim 11 wherein said monomeric compound (b) comprises hydroquinone di($\beta$-hydroxy ethyl) ether.

14. A composite structure according to claim 11 wherein said monomeric compound (b) comprises resorcinol di($\beta$-hydroxyethyl)ether.

15. A method of making a fiber-reinforced composite comprising the steps of
   (a) treating fiber reinforcing material with a curable elastomeric matrix compositions comprising an admixture of
   (a) at least one isocyanate-functional polyurethane composition comprising the reaction product of at least one diisocyanate compound selected from the group consisting of p-phenylene diisocyanate, m-phenylene diisocyanate, 1,4-cyclohexyl diisocyanate, tetramethylxylyl diisocyanate and dimethyl diphenyl diisocyanate and an active hydrogen atom-containing compound characterized by the presence of two hydroxyl groups or two thiol groups, said active hydrogen atom-containing compound containing no other isocyanate-reactive groups, and;
   (b) an amount effective to promote curing of said polyurethane of at least one monomeric compound having from 2 to 20 carbon atoms and two hydroxyl or thiol groups, said monomeric compound having no other isocyanate-reactive groups;
   (b) forming a layup of such treated material; and
   (c) curing such layup to provide said fiber-reinforced composite.

16. A method according to claim 15 wherein said monomeric compound (b) is present in a stoichiometric amount with respect to the isocyanate content of said polyurethane (a).

17. A method according to claim 15 wherein said polyurethane (a) has a free isocyanate content in the range from 2 to 20 percent.

18. A method according to claim 17 wherein said diisocyanate compound comprises p-phenylene diisocyanate.

19. A method according to claim 18 wherein said monomeric compound (b) comprises 1,4-butane diol.

20. A method according to claim 18 wherein said monomeric compound (b) comprises hydroquinone di($\beta$-hydroxyethyl) ether.

21. A method according to claim 18 wherein said monomeric compound (b) comprises resorcinol di($\beta$-hydroxyethyl) ether.

22. A structural material of claim 1, said fiber reinforcing element selected from the group consisting of carbon fibers, boron fibers, aromatic amide fibers, asbestos fibers, glass fibers silica fibers, silica alumina fibers, potassium nitrate fibers, silicon carbide fibers and boron intride fibers.

23. A structural material of claim 22 comprising from about 30 to about 85 percent by weight of said fiber reinforcing element; said active hydrogen atom-containing compound having a molecular weight from about 300 to about 3000; said monomeric compound having a molecular weight from about 50 to about 360.

24. A structural material of claim 23 wherein said polyurethane has a free isocyanate content in the range from about 2 to about 12 percent; said active hydrogen atom-containing compound is selected from the group consisting of polytetramethylene glycol, polycarbonate diol and polycaprolactone diol; said monomeric compound selected from the group consisting of 1,4-butane diol, hydroquinone di-($\beta$ hydroxyethyl) ether and resorcinol di-($\beta$ hydroxyethyl) ether.

25. A composite structure of claim 8, said fiber-reinforcing element selected from the group consisting of carbon fibers, boron fibers, aromatic amide fibers, asbestos fibers, glass fibers silica fibers, silica alumina fibers, potassium nitrate fibers, silicon carbide fibers and boron nitride fibers.

26. A composite structure of claim 25 comprising from about 30 to about 85 percent by weight of said fiber-reinforcing element; said active hydrogen atom-containing compound having a molecular weight from about 300 to about 3000; said monomeric compound having a molecular weight from about 50 to about 360.

27. A composite structure of claim 26 wherein said polyurethane has a free isocyanate content in the range from about 2 to about 12 percent; said active hydrogen atom-containing compound is selected from the group consisting of polytetramethylene glycol, polycarbonate diol, and polycaprolactone diol; said monomeric compound selected from the group consisting of 1,4-butane diol, hydroquinone di-($\beta$ hydroxyethyl) ether and resorcinol di-($\beta$ hydroxylethyl) ether.

* * * * *